March 9, 1954

M. R. ELLIOTT ET AL 2,671,520

POWERED HAND LIFT TRUCK DRIVE UNIT AND
WHEELED PLATFORM ATTACHMENT THERETO

Filed Feb. 13, 1951

INVENTORS.
MORRIS R. ELLIOTT
GEORGE L. TURNER
BY
ATTYS.

Patented Mar. 9, 1954

2,671,520

UNITED STATES PATENT OFFICE 2,671,520

POWERED HAND LIFT TRUCK DRIVE UNIT AND WHEELED PLATFORM ATTACHMENT THERETO

Morris R. Elliott and George L. Turner, Buchanan, Mich., assignors to Clark Equipment Company, Buchanan, Mich., a corporation of Michigan Application February 13, 1951, Serial No. 210,702

7 Claims. (Cl. 180—13)

Our present invention relates generally to powered hand lift trucks, and, more specifically, is directed to an attachment for converting a powered hand lift truck to a diminutive tow truck.

A powered hand lift truck of the character to which we make reference comprises a drive unit having a main frame, including a first vertical plate member extending transversely thereof, and load supporting means, including a second vertical plate member extending transversely thereof, disposed forwardly of the main frame. Formed integrally with the vertical edges of the second plate member are a pair of flange members which are disposed about the vertical edges of the first plate member for guiding the load supporting means on the main frame during relative vertical movement therebetween. The main frame is supported on a main wheel assembly, and the forward end of the load supporting means is supported on a pair of extensible wheel assemblies which are extended and retracted through suitable linkage means, actuated, for example, by means of a pair of hydraulic piston and cylinder assemblies carried by the main frame, rearwardly of the first plate member, adjacent each side of the main wheel assembly. A suitable steering handle is pivotally mounted to the main wheel assembly for effecting limited rotation of the latter about a vertical axis.

The primary object of our present invention is to provide an attachment for converting a powered hand lift truck, of the character above described, to a diminutive tow truck.

The attachment of our present invention comprises a vertical transverse plate member having a transverse brace means secured to its rear surface, adjacent the upper end thereof. Vertical flange members are secured to the rear surface of the plate member, at the sides thereof. Rearwardly extending side frame members are secured at their forward ends to the flange members, and the side frame members, at their rear ends, converge. Wheels are provided for supporting the rear end of the side frame members, and an operator's platform is mounted on the side frame members, at the rear ends thereof. A substantially vertically extending shield is mounted at the rear end of the operator's platform for protecting the operator. Suitable load engaging means in the form of couplings are mounted at the forward end of the plate member and at the rear end of the side frame members.

In converting the powered hand lift truck to a diminutive tow truck, the normally forwardly extending load supporting means of the lift truck is demounted from the first plate member of the main frame. The attachment of our present invention is then disposed about the main frame of the drive unit, with the transverse plate member of the attachment engaging the forward surface of the first plate member of the main frame and the transverse brace means of the attachment engaging the upper edge of the first plate member. The vertical flanges of the attachment then engage the side edges of the first plate member and are suitably bolted thereto. With the attachment suitably secured to the main frame, a substantially semi-circular opening is defined by the operator's platform, the side frame members, and the main frame. The steering handle of the powered hand lift truck extends through the aforedescribed opening and is adapted to be traversed within the opening for effecting rotation of the drive wheel assembly about its vertical axis.

It is another object of our present invention to provide an attachment of the character described which is of sturdy construction and light in weight, and which is diminutive in size and economical to manufacture.

Now, in order to acquaint those skilled in the art with the manner of constructing and using the device of our present invention, we shall describe, in connection with the accompanying drawings, a preferred embodiment of our invention.

Figure 1:
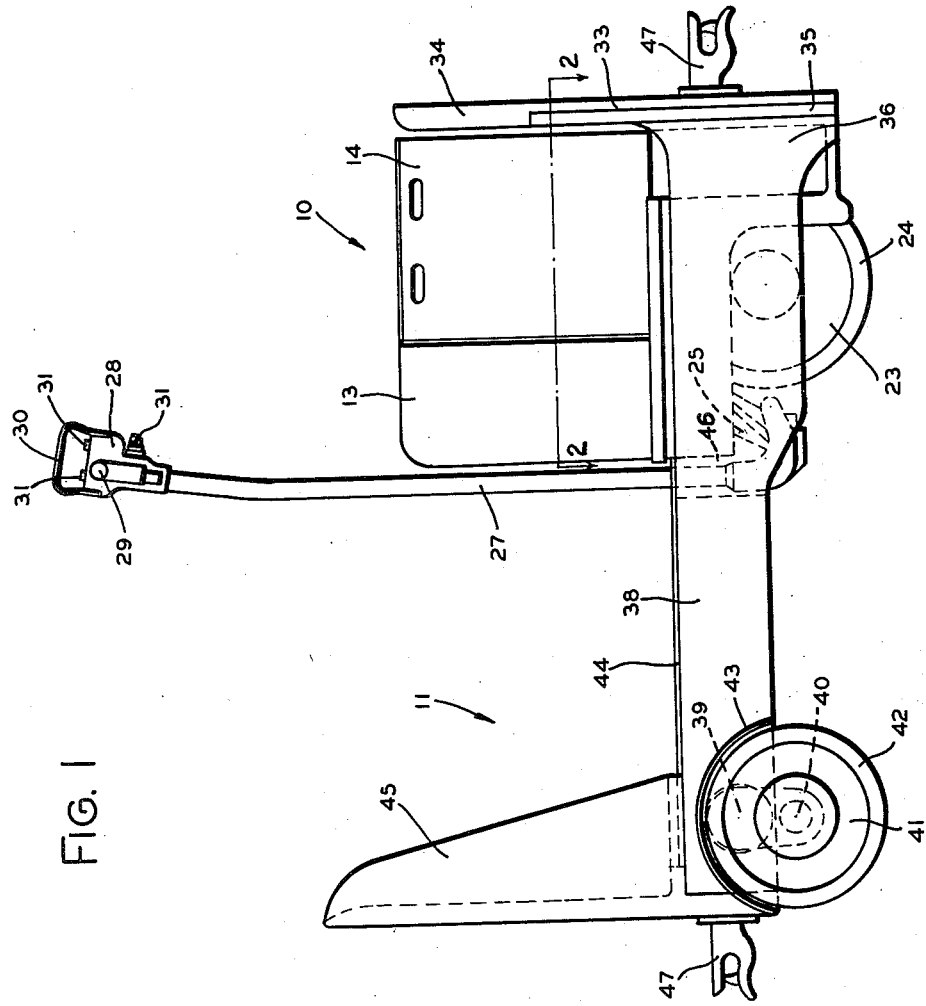
Figure 1 is a side elevational view of the attachment of our present invention mounted on the drive unit of a powered hand lift truck for converting the latter to a tow truck.

Referring now to the drawings, there is shown the drive unit of a powered hand lift truck, indicated generally by the reference numeral 10, to which the attachment of our present invention, indicated generally by the reference numeral 11, is secured. For a detail showing and description of a powered hand lift truck embodying the above referred to drive unit 10, reference may be had to the copending application of Wendell E. Boylan and George L. Turner, Serial No. 170,828, filed June 28, 1950. The drive unit 10 comprises a horizontally extending main frame 12 on which a pair of housing members 13 and 14 are mounted. Secured to the underside of the horizontal main frame 12 is a race member 16, which is supported upon a plurality of ball members 17 carried by a lower race member 18. A retaining ring 19 is secured to the underside of the race member 16 and co-operates with an annular flange extending radially from the lower race member 18 for positioning the latter relative to the upper race member 16. The lower race member 18 is secured to a rotatable horizontally extending ring member 20, to which, at each side thereof, is secured a depending plate member 21.

Rotatably mounted about a horizontal axis within the depending plate members 21, intermediate thereof, is a motor-in-wheel construction, indicated generally by the reference numeral 22. The motor-in-wheel construction 22 forms the subject matter of the copending application of Frederick E. Hawkins, Robert Lapsley, and George L. Turner, Serial No. 175,376, filed July 22, 1950, new Patent No. 2,608,598, issued August 26, 1952. The motor-in-wheel construction 22, briefly, comprises an electric motor casing 23 upon which is mounted, for rotation therewith, a tire 24. The horizontal rotatable ring member 20, the depending plate members 21, and the motor-in-wheel construction 22 are adapted to rotate as a unit about a vertical axis and thus the motor-in-wheel construction 22 may be utilized both for powering and steering the tow truck of our present invention. Suitable batteries are disposed in the aforementioned housing member 14 for effecting drive, in a known manner, of motor casing 23. Since the method of driving the tire 24 forms no part of our present invention, it is believed that a complete showing and description of the electric motor-in-wheel construction 22 is unnecessary for purposes of the present disclosure.

While the prime mover of the drive unit 10 has been described as comprising an electric motor-in-wheel construction, it will be readily understood that other forms of drive means may be provided without departing from the spirit of our invention. For example, in place of the electric motor-in-wheel construction, a hydraulic fluid motor-in-wheel construction may be provided. Such a hydraulic fluid motor-in-wheel construction forms the subject matter of the copending application of Frederick E. Hawkins, Robert Lapsley, and George L. Turner, Serial No. 175,377, filed July 22, 1950, now Patent No. 2,645,293, issued July 14, 1953. It will be still further understood that the tire 24 may be driven by an internal combustion engine in a manner fully disclosed in the copending application of Robert E. Burrus, Morris R. Elliott, and George L. Turner, Serial No. 195,434, filed November 13, 1950.

Secured to the lower surface of the rotatable frame member 20 is a downwardly extending bracket member 25 to which, at the lower end, is pivotally mounted the lower end of a normally substantially vertically extending tubular steering handle 27. Mounted to the upper end of the steering handle 27 is a steering head 28, from which extend, at each side thereof, a pair of co-axially aligned laterally projecting hand grips 29. Mounted across the top of the steering head 28 is an inverted U-shaped hand guard 30. Conveniently disposed about the steering head 28 are a plurality of operating buttons 31 which are adapted to be manipulated for starting and stopping the motor-in-wheel construction 22 and for operating various auxiliary devices (not shown) associated with the drive unit 10. Control lines, connecting the operating buttons 31 with the construction 22 and the auxiliary devices, are disposed within the tubular steering handle 27.

Secured to the forward edge of the horizontally extending main frame 12 is a vertical transversely extending plate member 32.

We shall now describe the details of construction of the attachment of our present invention, which, together with the aforedescribed drive unit 10, forms a diminutive tow truck.

Disposed adjacent the plate member 32 is a vertical transverse plate member 33. Suitable transverse brace means 34 is formed at the upper end of the plate member 33, and the brace means 34 is adapted to engage the upper edge of the plate member 32. Vertical flange members 35 are secured to the rear surface of the plate member 33, adjacent the sides thereof, and the flange members 35 engage the side edges of the plate member 32. Rearwardly extending side frame members 36 are secured at their forward ends to the rear edges of the flange members 35, and the plate member 33, together with the flange members 35 and the side frame members 36, are suitably secured to the plate member 32, as by bolts. The side frame members 36 are of curved configuration, and at their rear ends are formed with projections 37 which are secured, for example, by bolts in the forward ends of a pair of parallel rearwardly extending channel members 38. Mounted in the channel members 38, at the rear ends thereof, is a transverse axle 39 having downwardly offset end portions which are formed into spindles 40. Mounted on each of the spindles 40 is a wheel assembly 41 having a tire 42 secured thereon. Extending laterally from the channel members 38, closely adjacent the peripheries of the tires 42, are curved fenders 43.

A suitable operator's platform 44 is secured to the upper edges of the channel members 38. Mounted at the rear end of the operator's platform 44 is a substantially vertically extending shield 45, which is provided for protecting the operator of the vehicle. The vertically extending shield 45 and the fenders 43 may be formed as an integral casting, and secured to the rear ends of the channel members 38 for providing rigidity to the frame of the attachment of our present invention.

Figure 2:
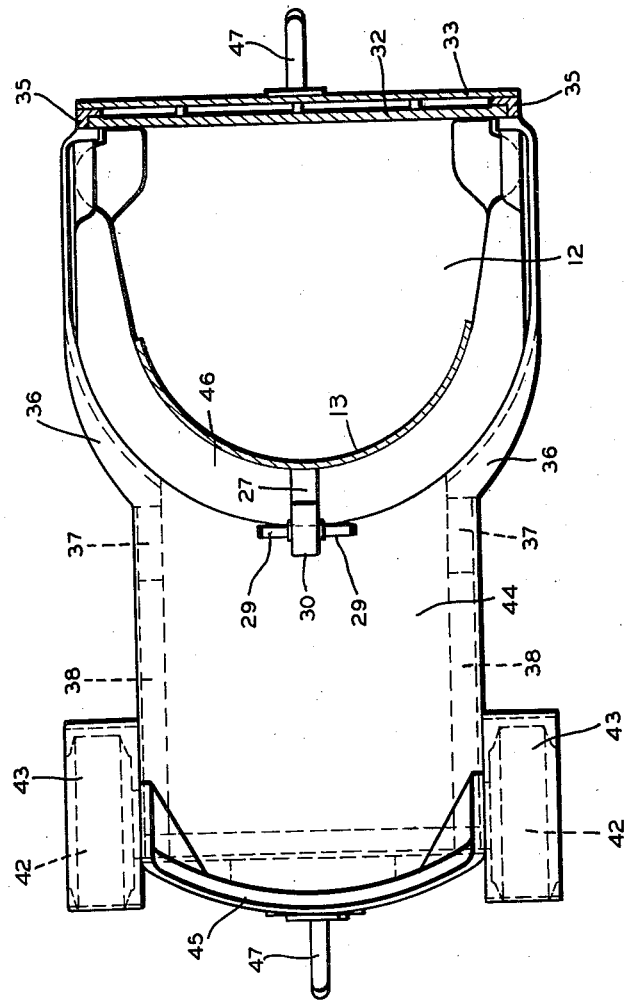
Figure 2 is a plan view of the tow truck with the battery housing removed and with additional portions being broken away and shown in section along the line 2—2 of Figure 1.
Figure 3:
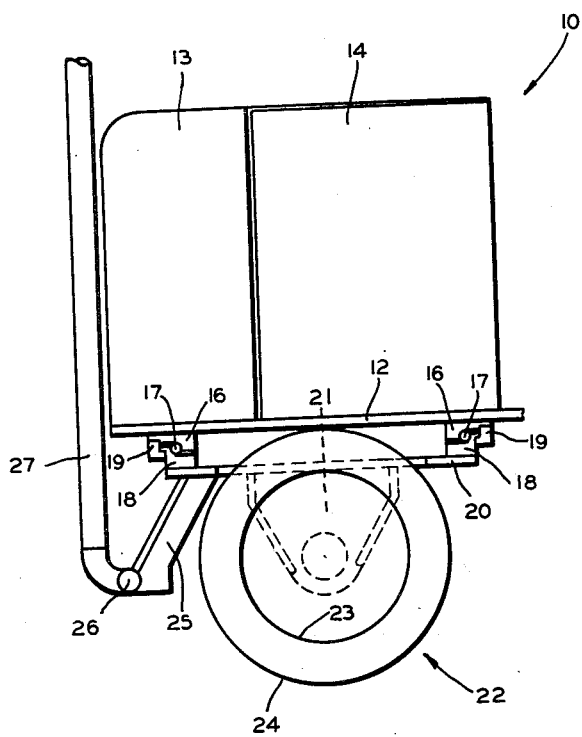
Figure 3 is a vertical sectional view showing the mounting of the main wheel assembly in the main frame of the truck of Figure 1.

It will be observed from the drawings that the side frame members 36 and the operator's platform 44, together with the main frame 12, define a substantially semi-circular opening 46, as viewed in Figure 2, through which the steering handle 27 extends. The steering handle 27 is adapted to be traversed from one end of the opening 46 to the other end for effecting rotation of the ring member 20 and the motor-in-wheel construction 22 about a vertical axis.

Suitable load engaging members, preferably in the form of conventional couplings 47, are secured to the forward surface of the plate member 33 and to the rear end of the shield 45. The couplings 47, in a known manner, are adapted to engage with co-operating members secured to load carrying trailer units, whereby the latter may be towed or pushed from one location to the other.

From the foregoing description, it will be seen that we have provided an attachment for the drive unit of a powered hand lift truck for converting the latter to a diminutive tow truck. Obviously, the most expensive part of a powered hand lift truck is the drive unit. Therefore, by utilizing the attachment of our present invention, it will be readily apparent that a drive unit of the character described may be used interchangeably with a known load elevating and supporting mechanism, or with the attachment of our present invention.

While we have shown and described what we believe to be a preferred embodiment of our present invention, it will be understood that various modifications and rearrangements may be made therein without departing from the spirit and scope of our present invention.

We claim:

1. For use with an industrial truck having a frame including a vertical transverse plate member at one end thereof, a drive wheel assembly including a drive wheel, means for pivotally mounting the assembly about a vertical axis in the frame, a generally vertically extending steering handle horizontally swingable for effecting limited rotation of the drive wheel assembly about its vertical axis, the steering handle being disposed at the other end of the frame, and means for driving the drive wheel, the combination of an operator's platform at the said other end of the frame adjacent the steering handle, means for securing said platform at one end thereof to the vertical transverse plate member, wheels for supporting said platform at the other end thereof, and load engaging means at the said other end of said platform.

2. For use with an industrial truck having a frame including a first vertical transverse plate member at the forward end thereof, a drive wheel assembly including a drive wheel, means for pivotally mounting the assembly about a vertical axis in the frame, a steering handle for effecting limited rotation of the drive wheel assembly about its vertical axis, the steering handle being disposed at the rear end of the frame, the combination of a second vertical transverse plate member adapted to be secured to the first vertical transverse plate member, rearwardly extending side frame members secured at their forward ends to said second vertical transverse plate member, an operator's platform mounted on said side frame members at the rear ends thereof, wheels for supporting the rear end of said side frame members, and load engaging means at one of the ends of said side frame members.

3. For use with an industrial truck having a frame including a first vertical transverse plate member at the forward end thereof, a drive wheel assembly including a drive wheel, means for pivotally mounting the assembly about a vertical axis in the frame, a steering handle for effecting limited rotation of the drive wheel assembly about its vertical axis, the steering handle being disposed at the rear end of the frame, the combination of a second vertical transverse plate member adapted to be secured to the first vertical transverse plate member, rearwardly extending side frame members secured at their forward ends to said second vertical transverse plate member, an operator's platform mounted on said side frame members at the rear ends thereof, wheels for supporting the rear end of said side frame members, and load engaging means at the forward end of said second vertical transverse plate member and at the rear end of said side frame members.

4. For use with an industrial truck having a frame including a first vertical transverse plate member at the forward end thereof, a drive wheel assembly including a drive wheel, means for pivotally mounting the assembly about a vertical axis in the frame, a steering handle for effecting limited rotation of the drive wheel assembly about its vertical axis, the steering handle being disposed at the rear end of the frame, the combination of a second vertical transverse plate member adapted to be disposed closely adjacent to the forward surface of the first plate member, transverse brace means secured to the rear surface of said second plate member adjacent the upper end thereof, said transverse brace means being adapted to be disposed in engagement with the upper edge of the first plate member, vertical channel members secured to the rear surface of said second plate member adjacent the sides thereof and being adapted to be disposed in engagement with the side edges of the first plate member, rearwardly extending side frame members secured at their forward ends to said vertical channel members and at their rear ends being offset laterally inwardly, an operator's platform mounted on said side frame members at the rear ends thereof, said operator's platform and side frame members being spaced from the truck frame to define a substantially semicircular opening through which the steering handle is adapted to extend and be traversed for effecting rotation of the drive wheel assembly about its vertical axis, wheels for supporting the rear end of said side frame members, a substantially vertically extending shield mounted at the rear end of said side frame members, and load engaging means at the forward end of said second plate member and at the rear end of said side frame members.

5. In combination, an industrial truck having a frame including a first vertical transverse plate member at the forward end thereof, a drive wheel assembly including a drive wheel, means for mounting said assembly about a vertical axis in said frame, a steering handle for effecting limited rotation of said drive wheel assembly about its vertical axis, said steering handle being disposed at the rear end of said frame, means for driving said drive wheel, a second vertical transverse plate member adapted to be secured to said first vertical transverse plate member, rearwardly extending side frame members secured at their forward ends to said second vertical transverse plate member, an operator's platform mounted on said side frame members at the rear end thereof, wheels for supporting said side frame members at the rear end thereof, and load engaging means at the forward end of said second vertical transverse plate member and at the rear end of said side frame members.

6. For use with an industrial truck having a frame including a vertical transverse plate member at the forward end thereof, a drive wheel assembly including a drive wheel, means for pivotally mounting the assembly about a vertical axis in the frame, a steering handle for effecting limited rotation of the drive wheel assembly about its vertical axis, the steering handle being disposed at the rear end of the frame, the combination of rearwardly extending side frame members adapted to be secured at their forward ends to said vertical transverse plate member, an operator's platform mounted on said side frame members at the rear ends thereof, wheels for supporting the rear end of said side frame members, and load engaging means at one of the ends of said side frame members.

7. For use with an industrial truck having a frame, a drive wheel assembly including a drive wheel, means for pivotally mounting the assembly about a vertical axis in the frame, a steering handle for effecting limited rotation of the drive wheel assembly about its vertical axis, the steering handle being disposed at the rear end of the frame, the combination of rearwardly extending side frame members adapted to be secured at their forward ends to the forward end of the frame, an operator's platform mounted on said side frame members at the rear ends thereof, wheels for supporting the rear end of said side frame members, and load engaging means at one of the ends of said side frame members.

MORRIS R. ELLIOTT.
GEORGE L. TURNER.

References Cited in the file of this patent

UNITED STATES PATENTS

| Number | Name | Date |
|---|---|---|
| 763,494 | Lacoin | June 28, 1904 |
| 1,230,340 | Sweet | June 19, 1917 |
| 1,663,299 | Grist | Mar. 20, 1928 |
| 1,844,510 | Kennedy | Feb. 9, 1932 |

FOREIGN PATENTS

| Number | Country | Date |
|---|---|---|
| 323,401 | Great Britain | Jan. 2, 1930 |
| 489,278 | Great Britain | July 20, 1938 |